Patented Apr. 7, 1931

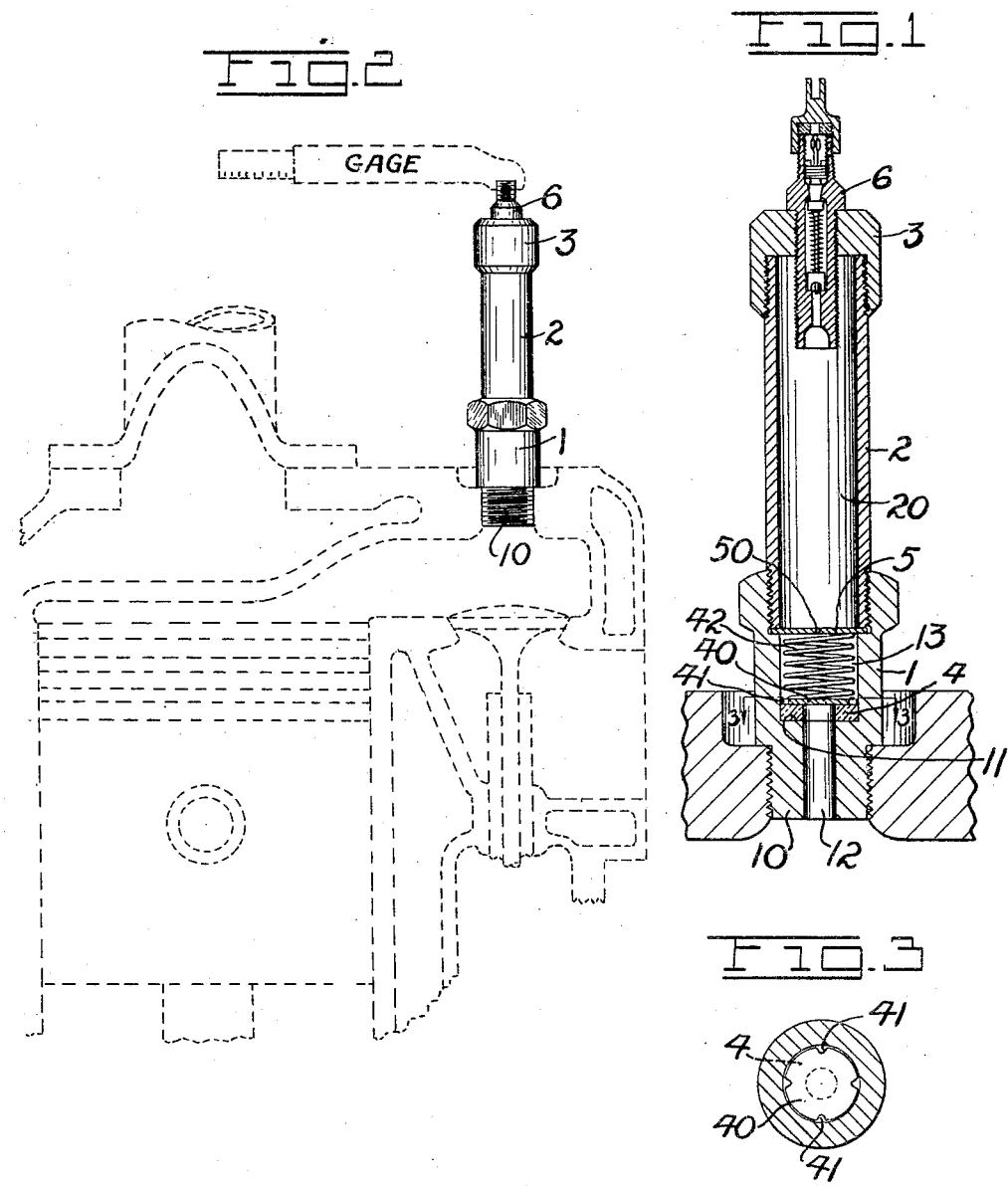

1,799,832

UNITED STATES PATENT OFFICE

RICHARD RINNE, OF TACOMA, AND MARTIN L. APPEL, OF SUMNER, WASHINGTON

ADAPTER FOR PRESSURE GAUGES

Application filed April 15, 1929. Serial No. 355,392.

Our invention relates to adapters for use in applying pressure gauges to determine the pressures existing in engine cylinders.

The object of our invention is to provide means for better and more accurately determining the maximum pressures existing in engine cylinders, more particularly the maximum pressure caused by compression.

A further object is to provide a simple and readily applicable means which will permit the use of a tire pressure gauge or other suitable type of pressure gauge, for determining the pressure.

Our invention consists in the use of a pressure retaining chamber, readily applicable to the cylinder, into which gases from the cylinder may be trapped and held until the pressure has been built up to the maximum produced in the cylinder, and to which a pressure gauge may be applied.

It consists further in the provision of means whereby the impulses caused by the rapid action of the compression may be softened so as to avoid the blows upon the gauge which would be caused by direct and immediate application of these pressures thereto.

In the accompanying drawings we have shown a simple and efficient construction applicable to the carrying out of our invention. In the following specification we will describe the same and the manner of its use, and in the claims will define the novel features of our invention.

Figure 1 is a longitudinal section through the adapter.

Figure 2 illustrates the manner of applying the same to an engine of a well known construction.

Figure 3 is a section taken on the line 3—3 of Fig. 1.

The present preferred form of construction for our device employs two parts 1 and 2, which, together with the removable cap 3, form a pressure accumulating or retaining reservoir, tank, or casing which is connected by one end with the interior of the engine cylinder, as by the axially bored and exteriorly threaded neck 10, adapted to be screwed into the spark plug opening for a cylinder.

Within or just inwardly of neck 10 a ledge 11 surrounds the axial bore 12. At the inner end of the bore 12 is located a valve which will act to prevent return of gases discharged from the cylinder into the reservoir. Any effective type of valve may be employed for this. That shown consists of a ring or washer 4 seated upon ledge 11 and composed of rubber or other relatively soft material, and a valve disk 40. The latter should be of a construction which will permit gases passing about its edges, or through notches, as 41, in its edge. A spring 42 insures seating of the valve.

The two reservoir or container sections 1 and 2 are secured together, as by threading, and between them is secured a diaphragm or partition 5 having a small bleed hole, as 50, or otherwise constructed to provide for a highly throttled flow connection between the chambers at each side thereof.

At the other end of the adapter the cap is provided with a pressure retaining valve assembly which is adapted to the application of a gauge thereto. This may be identical in construction and principle of action with the valve assembly used on pneumatic tires. Such a device has been shown, although any other type of construction by which equivalent results may be secured may be used. In view of the well known and standard character of this construction a specific description thereof is deemed to be unnecessary.

The operation of our device is as follows:

To determine the compression in a cylinder, the end 10 is screwed into a spark plug opening and the engine is turned over a few times. This causes the reservoir or barrel 1—2 to be charged with gases at the pressure of maximum compression produced in the cylinder. The valve 40 freely admits this pressure to the chamber 13, but the diaphragm 5 prevents the blow effect of a rapidly produced compression acting upon the chamber 20. The small area of the by-passage 50 causes a continuous and regular flow into chamber 20. Turning over of the engine should continue until the pressure has been built up to that of maximum compression. When this condition has been reached a gauge, operating in the same manner as a tire gauge, may be applied and will register the accumulated pressure, which will be that of the compression produced in the engine cylinder.

While it may be desirable to do so, the application of the gauge need not wait until the pressure has been built up to that of the compression, as the partition 5 and the reduced by-pass hole therein will eliminate the hammer effect of the compression upon the gauge. By the use of the wire-drawing caused by partition 5 the gauge may be applied even before turning over the engine. If the diaphragm be not used the application of the gauge had better wait until the pressure in chamber 20 has been entirely built up.

By the use of a device of this character an accurate determination of the compression pressure in a cylinder may be secured. This will be of great help in diagnosing the condition of the valves and cylinder rings, and will substitute certainty for uncertainty.

One reason for making the reservoir in the two parts, 1 and 2, is to facilitate the application of the adapter to spark plug openings of different sizes or threads. It is contemplated that a plurality of base sections 1 be provided, these having necks 10 of different sizes and different gauge of thread to fit different openings, and to use the base which fits the particular plug opening. The same result might be secured by simply adding a proper adapter to the neck 10, but we prefer to do it in the other way.

What we claim as our invention is:—

1. An adapter for use in measuring engine cylinder pressures comprising a gas storing reservoir adapted to be connected with the engine cylinder, a valve at the pressure receiving end thereof preventing back flow of gas, an axially bored stem projecting from and in communication with said reservoir, and a tire valve core received in said stem.

2. An adapter for use in measuring engine cylinder pressures having a gas retaining reservoir adapted to be connected with the engine cylinder, means for preventing back flow of gases from said reservoir, an axially bored stem threaded in the wall of the reservoir, and a removable tire valve core received in the bore of said stem, whereby a tire pressure gauge may be applied to the stem to read the pressure within the reservoir.

Signed at Seattle, Washington, this 9th day of April, 1929.

RICHARD RINNE.
MARTIN L. APPEL.